United States Patent
McBrearty

(10) Patent No.: US 10,901,637 B2
(45) Date of Patent: Jan. 26, 2021

(54) ALLOCATING STORAGE SYSTEM PORTS TO VIRTUAL MACHINES

(71) Applicant: International Business Machines Corporation, Armonk, NY (US)

(72) Inventor: Gerald F. McBrearty, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 29 days.

(21) Appl. No.: 16/353,123

(22) Filed: Mar. 14, 2019

(65) Prior Publication Data

US 2020/0293210 A1 Sep. 17, 2020

(51) Int. Cl.
*G06F 9/455* (2018.01)
*G06F 21/53* (2013.01)
*G06F 3/06* (2006.01)
*G06F 21/54* (2013.01)

(52) U.S. Cl.
CPC ............ *G06F 3/0635* (2013.01); *G06F 3/067* (2013.01); *G06F 3/0607* (2013.01); *G06F 9/45558* (2013.01); *G06F 21/54* (2013.01); *G06F 21/53* (2013.01); *G06F 2009/45583* (2013.01); *G06F 2009/45587* (2013.01); *G06F 2009/45595* (2013.01)

(58) Field of Classification Search
CPC . G06F 2009/45587; G06F 2009/45595; G06F 21/53
See application file for complete search history.

(56) References Cited

U.S. PATENT DOCUMENTS

| | | |
|---|---|---|
| 9,483,742 B1 | 11/2016 | Ahmed |
| 9,519,795 B2 | 12/2016 | Guarrieri et al. |
| 2017/0093918 A1* | 3/2017 | Banerjee ............... H04L 63/101 |

OTHER PUBLICATIONS

Vaninetti, Fausto, "Design a Reliable and Highly Available Fibre Channel SAN", Cisco White Paper, 2017.
Hewlett Packard, "HP Matrix Operating Environment and HP Storage Provisioning Manager support for port groups", Technical white paper, Dec. 2013.
(Continued)

*Primary Examiner* — Zachary K Huson
(74) *Attorney, Agent, or Firm* — Martin & Associates, LLC; Derek P. Martin

(57) ABSTRACT

A storage system port allocator allows defining multiple whitelists for automatically allocating ports on a storage system to virtual machines. An administrator can manually define one or more of the whitelists. In addition, the storage system port allocator can automatically generate one or more whitelists based on defined rules for generating whitelists, and the administrator can then accept, edit, or ignore the automatically-generated whitelists. A whitelist selection policy is defined that determines criteria for selecting among the multiple whitelists for allocating ports to virtual machines. A whitelist zoning policy can define criteria for zoning initiator virtual machines to storage system ports in the whitelists. The storage system port allocator then allocates storage system ports to initiator virtual machines using one or more of the whitelists according to the selected whitelist that is selected according to the whitelist selection policy, and according to the whitelist zoning policy.

17 Claims, 8 Drawing Sheets

(56) References Cited

OTHER PUBLICATIONS

IBM, "Handling FC Zoning in Virtual FC Bridges", IP.com No. IPCOM000190343D, Nov. 24, 2009.
Disclosed Anonymously, Fabric Zone Creation Based on Analysis of Existing Zones:, IP.com No. IPCOM000234101D, Jan. 13, 2014.
Disclosed Anonymously, Method and Apparatus to Connect Multiple FC Hosts to Centralized Storage without a FC SAN Fabric:, IP.com No. IPCOM000240291D, Jan. 21, 2015.
IBM, PowerVC 1.4.2, printed from https://developer.ibm.com/powervc/2018/10/09/announcing-powervc-1-4-2/, Oct. 9, 2018.

* cited by examiner

| Initiator VMs |
|---|
| A1 |
| A2 |
| B1 |
| B2 |

FIG. 18

| Port Allocations | |
|---|---|
| Initiator VMs | Ports |
| A1 | $J_A$ |
| A2 | $K_A$ |
| B1 | $G_B$ |
| B2 | $N_B$ |

ALLOCATING STORAGE SYSTEM PORTS TO VIRTUAL MACHINES

BACKGROUND

1. Technical Field

This disclosure generally relates to computer systems, and more specifically relates to allocating storage system ports to virtual machines in a virtualized computing environment.

2. Background Art

Many modern computer systems employ virtualization that enables a computer to be logically partitioned into virtual machines that can each run a different operating system or a different instance of the same operating system, thereby providing the appearance of separate machines. A virtual machine manager, sometimes called a hypervisor, manages and controls virtual machines. Virtualization is increasingly used in data centers and cloud computing, where hardware can be dynamically provisioned and deprovisioned to virtual machines based on changes in workload.

Many virtualization environments include storage systems, such as storage area networks (SANs). Orchestration engines such as OpenStack, an opensource community project, can be used in a virtualization environment to map physical resources, such as ports on storage systems, to virtual machines created and managed by a hypervisor.

BRIEF SUMMARY

A storage system port allocator allows defining multiple whitelists for automatically allocating ports on a storage system to virtual machines. An administrator can manually define one or more of the whitelists. In addition, the storage system port allocator can automatically generate one or more whitelists based on defined rules for generating whitelists, and the administrator can then accept, edit, or ignore the automatically-generated whitelists. A whitelist selection policy is defined that determines criteria for selecting among the multiple whitelists for allocating ports to virtual machines. A whitelist zoning policy can define criteria for zoning initiator virtual machines to storage system ports in the whitelists. The storage system port allocator then allocates storage system ports to initiator virtual machines using one or more of the whitelists according to the selected whitelist that is selected according to the whitelist selection policy, and according to the whitelist zoning policy.

The foregoing and other features and advantages will be apparent from the following more particular description, as illustrated in the accompanying drawings.

BRIEF DESCRIPTION OF THE SEVERAL VIEWS OF THE DRAWING(S)

The disclosure will be described in conjunction with the appended drawings, where like designations denote like elements, and:

FIG. 18 shows a table of initiator virtual machines; and

FIG. 19 shows a table of port allocations between initiator virtual machines and storage system ports using the second whitelist 1620 shown in FIG. 16.

DETAILED DESCRIPTION

A storage system port allocator allows defining multiple whitelists for automatically allocating ports on a storage system to virtual machines. An administrator can manually define one or more of the whitelists. In addition, the storage system port allocator can automatically generate one or more whitelists based on defined rules for generating whitelists, and the administrator can then accept, edit, or ignore the automatically-generated whitelists. A whitelist selection policy is defined that determines criteria for selecting among the multiple whitelists for allocating ports to virtual machines. A whitelist zoning policy can define criteria for zoning initiator virtual machines to storage system ports in the whitelists. The storage system port allocator then allocates storage system ports to initiator virtual machines using one or more of the whitelists according to the selected whitelist that is selected according to the whitelist selection policy, and according to the whitelist zoning policy.

Figure 1:
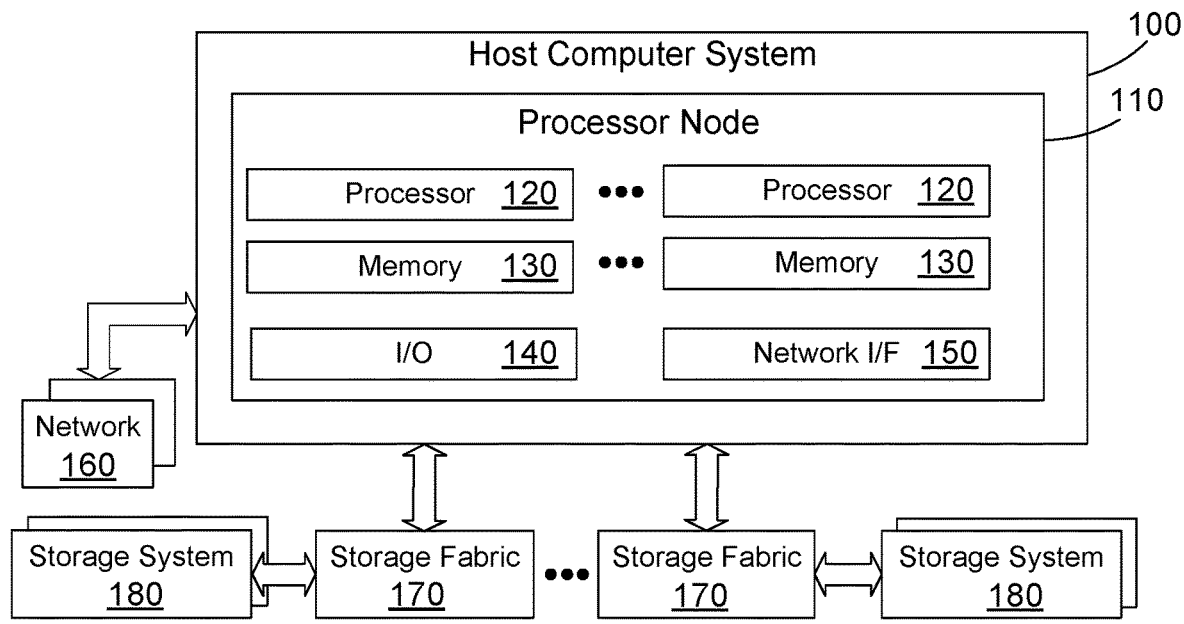
FIG. 1 is a hardware block diagram of a host computer system.

Referring to FIG. 1, a host computer system 100 is shown as one suitable example of a computer system that supports virtualization. The host computer system 100 could be one of many host computer systems in a pool of host computer systems in a virtualized computing environment. Each processor node 110 includes one or more processors 120, one or more memory devices 130, and in some embodiments, additional hardware that may include input/output (I/O) hardware 140 such as one or more input/output (I/O) adapters, and/or network interface 150. I/O hardware 140 can include an interface to a mass storage device, such as a disk drive or a flash memory device. The network interface 150 or other networking functionality not explicitly shown in FIG. 1 may be used to provide data communication between multiple processor nodes 110 and host computer system 100, as well as other external systems. The networking interface 150 may be connected to an external network 160.

Network interface 150 may be used to connect host computer system 100 to other computer systems or workstations via network 160. Network interface 150 broadly represents any suitable way to interconnect electronic devices, regardless of whether the network 160 comprises present-day analog and/or digital techniques or via some networking mechanism of the future. Network interface 150 preferably includes a combination of hardware and software that allows communicating on the network 160. Software in the network interface 150 preferably includes a communication manager that manages communication with other computer systems via network 160 using a suitable network protocol. Many different network protocols can be used to implement a network. These protocols are specialized computer programs that allow computers to communicate across a network. TCP/IP (Transmission Control Protocol/Internet Protocol) is an example of a suitable network protocol that may be used by the communication manager within the network interface 150. In one suitable implementation, the network interface 150 is a physical Ethernet adapter.

Each processor 120 may be constructed from one or more microprocessors and/or integrated circuits. Processor 120 executes program instructions stored in memory 130. Memory 130 stores programs and data that processor 120 may access. When host computer system 100 starts up, processor 120 initially executes the program instructions that make up an operating system. Processor 120 also executes software for managing logical partitions, such as a hypervisor 280 shown in FIG. 2.

The host computer system 100 may be implemented using any of a number of different architectures suitable for implementing a virtualized environment. For example, in one embodiment, host computer system 100 may include one or more Power-based systems available from International Business Machines Corporation. It will be appreciated, however, that other architectures suitable for executing virtualized environments may be used in other embodiments of the invention, so the invention is not limited to the particular architecture disclosed herein.

Each processor 120 may be implemented as a single or multi-threaded processor and/or as a single or multi-core processor, while each memory 130 may be considered to include one or more levels of different types, sizes and speeds of memory devices in a suitable memory hierarchy, which may include data caches, instruction caches, combination data/instruction caches, dynamic random-access memory (DRAM), flash memory, disk memory, etc. In addition, the memory 130 may be considered to include memory storage located elsewhere in host computer system 100, as well as any storage capacity used as a virtual memory, such as a mass storage device. Host computer system 100 operates under the control of one or more kernels, hypervisors, operating systems, etc. The host computer system 100 may execute any suitable software to perform its intended function.

Figure 2:
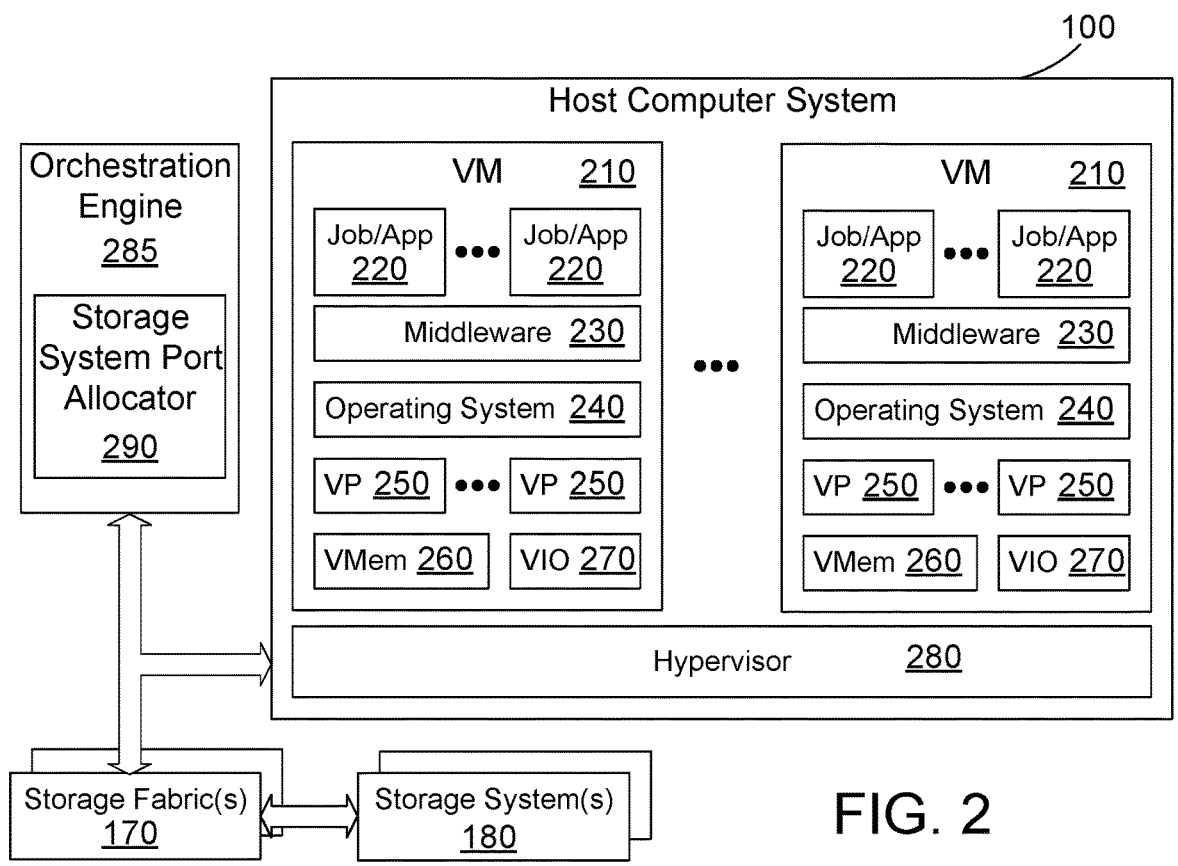
FIG. 2 is a software block of the host computer system shown in FIG. 1.

FIG. 2 illustrates various software components that may be resident within the host computer system 100. A hypervisor 280 may host one or more virtual machines (VMs) 210 and may allocate to each virtual machine 210 a portion of the physical hardware resources of the host computer system 100, such as processor, memory, I/O and network resources. Hypervisors are sometimes referred to in the art as virtual machine managers. Some examples of virtual resources allocated to a virtual machine are shown in FIG. 2 as one or more virtual processors (VPs) 250, a virtual memory (VMem) 260, and virtual input/output (VIO) resources 270. Each virtual machine 210 may host an operating system 240 and may optionally include middleware 230, as well as one or more jobs and/or applications 220. It will be appreciated that each virtual machine 210, which may also be referred to as a logical partition, virtual server or virtual computer, may operate in a manner that emulates a separate physical computer system, and as such, may host practically any software components capable of being hosted by a physical computer system.

Additional hardware and/or software components may also be resident in host computer system 100, such as mass storage hardware, external input/output devices such as printers or displays, and management hardware and/or software, including a hardware management console (HMC) through which the hardware and/or software configuration of the apparatus may be managed by an administrator. Further, in the illustrated embodiments, connectivity to one or more external networks 160 may also be supported, as may connectivity to one or more storage systems 180 through one or more storage fabrics 170. Virtualized environments may be implemented in many different ways, and may include a vast number of hardware and/or software variations, and as such, the invention is not limited to the particular implementation disclosed herein.

FIG. 2 further shows an orchestration engine 285 that is used to manage the host computer system 100 along with other host computers systems in a virtualization environment. OpenStack is an example of a known orchestration engine for a cloud virtualization environment. The orchestration engine 285 shown in FIG. 2 differs from OpenStack by including a storage system port allocator 290. The storage system port allocator 290 communicates with one or more storage subsystems 180 via the storage fabrics 170 to determine ports that can be allocated to virtual machines, then allocates those ports to virtual machines via hypervisor 280. The functions of the storage system port allocator 290 are described in more detail below. The orchestration engine 285 and storage system port allocator 290 can reside in a computer system separate from host computer system 100, and communicate with the host computer system via a network such as 160 shown in FIG. 1. In one embodiment, the storage system port allocator 290 resides on computer recordable media coupled to the I/O hardware 140 shown in FIG. 1 to provide a program product.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 3:
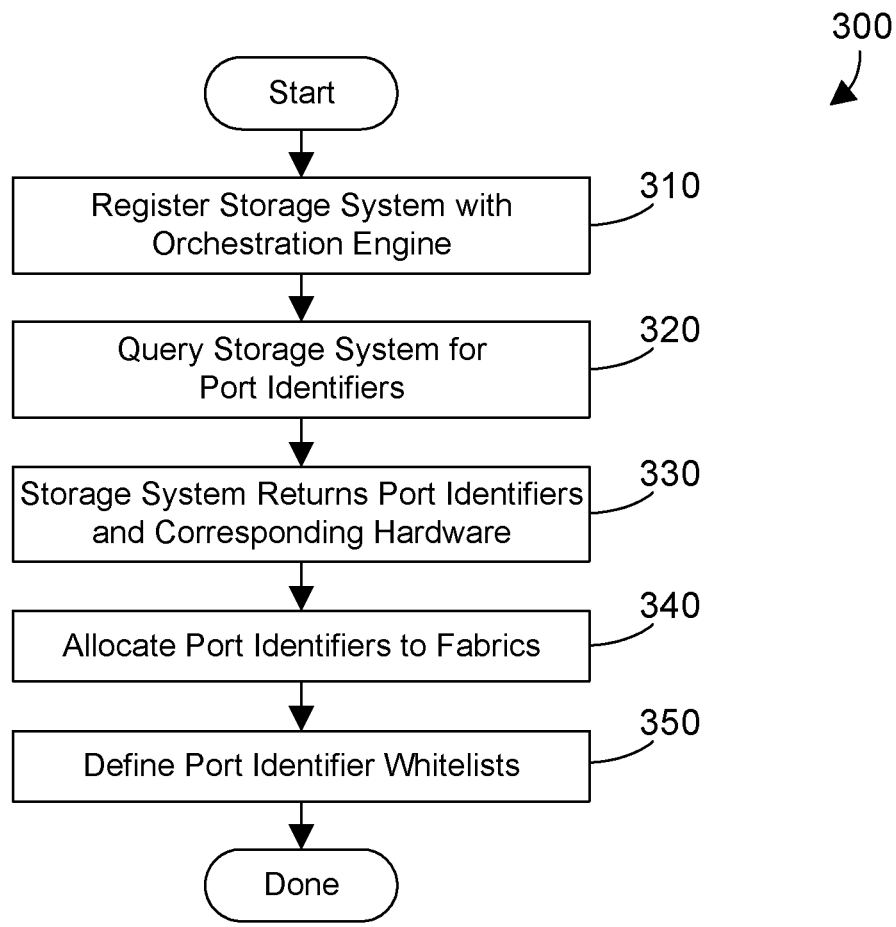
FIG. 3 is a flow diagram of a method for generating port identifier whitelists.

Referring to FIG. 3, a method 300 begins when a storage system is registered with the orchestration engine (step 310). In response, the storage system is queried for port identifiers (step 320). The storage system returns the port identifiers and their corresponding hardware (step 330). The port identifiers are then allocated to fabrics (step 340). Multiple port identifier whitelists are then defined (step 350). Method 300 is then done. In the most preferred implementation, steps 320, 330, 340 and 350 are performed by the storage system port allocator 290 shown in FIG. 2.

Figure 4:
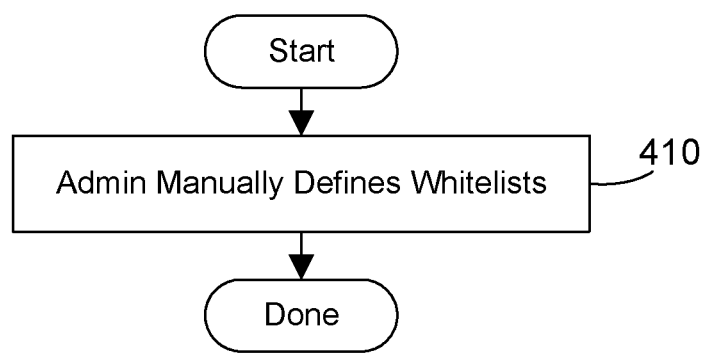
FIG. 4 is a flow diagram of a method for an administrator to manually define one or more port identifier whitelists.
Figure 5:
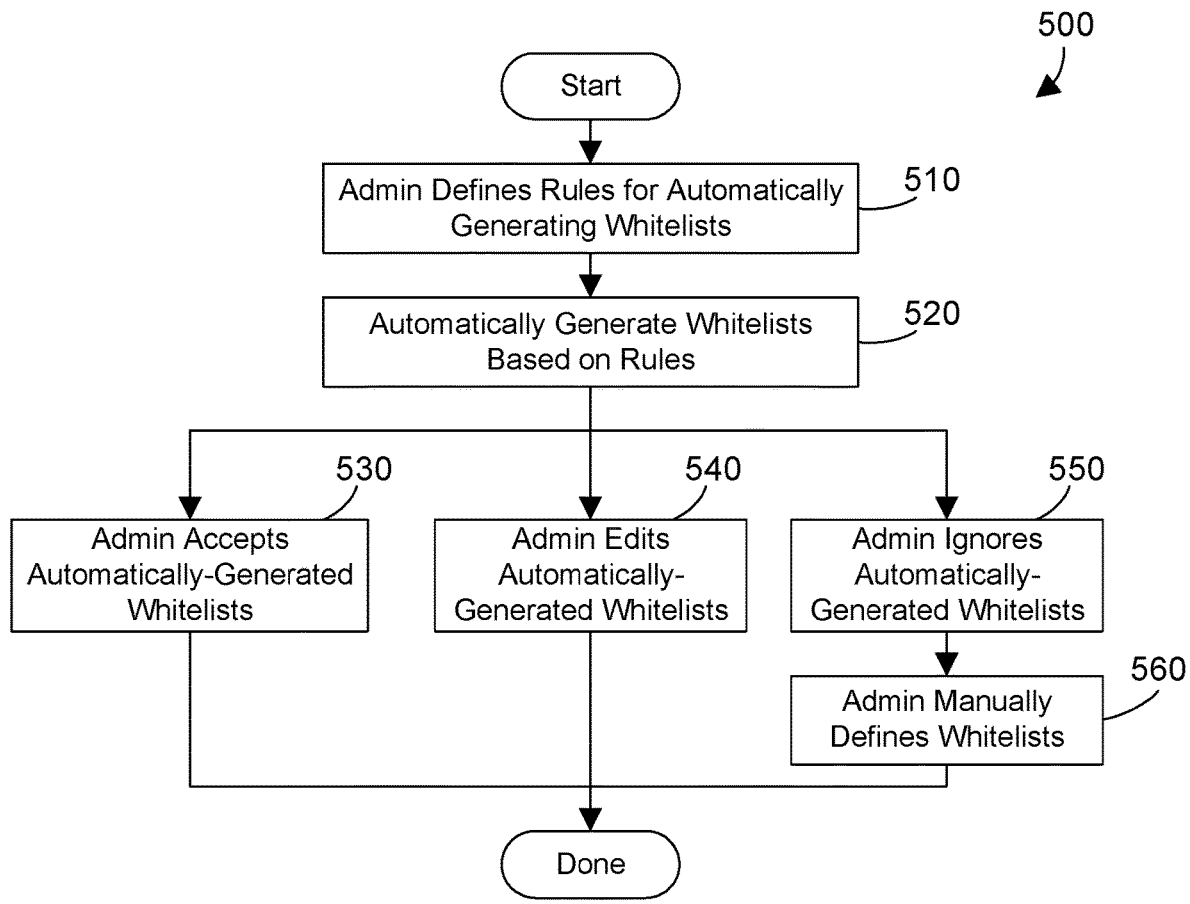
FIG. 5 is a flow diagram of a method for automatically generating one or more port identifier whitelists, with the options for an administrator to accept, edit, or ignore the automatically-generated port identifier whitelists.

One suitable way to define port identifier whitelists in step 350 in FIG. 3 is for an administrator to manually define one or more whitelists (step 410), as shown in FIG. 4. Another suitable way to define port identifier whitelists in step 350 in FIG. 3 is shown in method 500 in FIG. 5. An administrator defines rules for automatically generating whitelists (step 510). Multiple whitelists are then generated based on the defined rules (step 520). Once the whitelists are automatically generated in step 520, the administrator has three options. The first option is for the administrator to accept the automatically-generated whitelists (step 530). The second option is for the administrator to edit one or more of the automatically-generated whitelists (step 540). The third option is for the administrator to ignore the automatically-generated whitelists (step 550) and manually define multiple whitelists (step 560). Method 500 is then done. Once method 550 is complete, a plurality of port identifier whitelists have been defined that can then be used to automatically allocate storage system ports to virtual machines.

Figure 6:
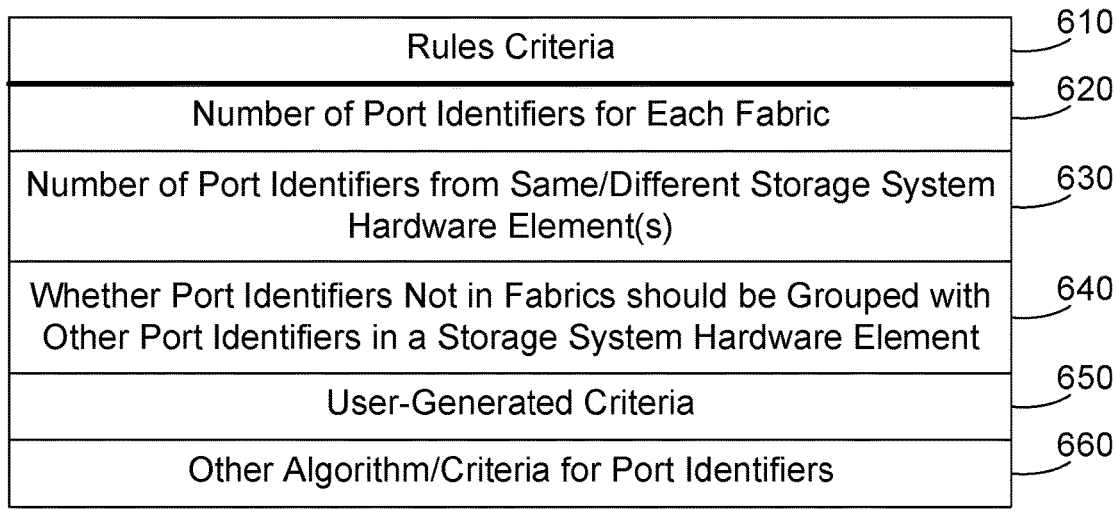
FIG. 6 shows a table of sample rules criteria that could be used in rules for generating port identifier whitelists.

FIG. 6 shows a table 610 that includes various criteria that could be used in formulating rules for automatically generating whitelists. Table 610 thus shows criteria that could be incorporated into the rules defined in step 510 in FIG. 5. The rules criteria include: number of port identifiers for each fabric 620; number of port identifiers from the same or different storage system hardware elements 630; whether port identifiers not in fabrics should be grouped with other port identifiers in a storage system hardware element 640; any user-generated criteria 650; and any other algorithm or criteria for port identifiers 660.

Figure 7:
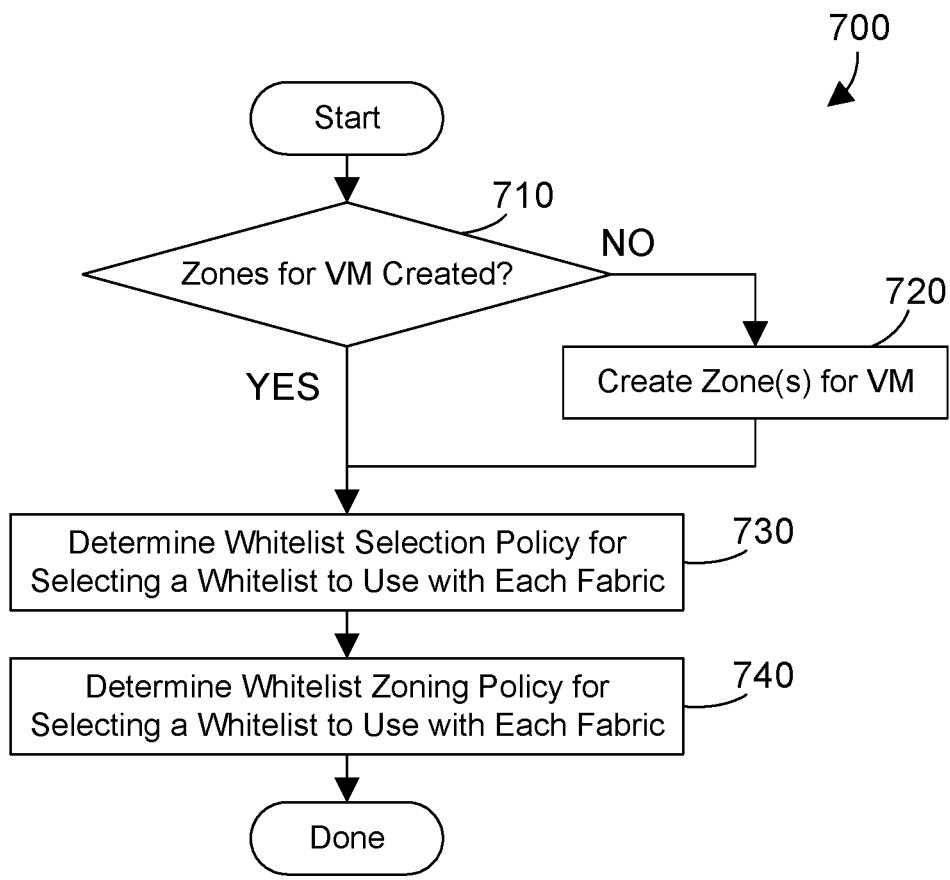
FIG. 7 is a flow diagram of a method for determining a selection policy and zoning policy for allocating port identifiers to virtual machines.

Referring to FIG. 7, a method 700 is preferably performed by the storage system port allocator 290 shown in FIG. 2. When zones for a VM have not been created (step 710=NO), one or more zones for the VM are created (step 720). When zones for a VM have already been created (step 710=YES), no zones need to be created for the VM. A whitelist selection policy is determined for selecting a whitelist to use with each fabric (step 730). A whitelist zoning policy is determined for selecting a whitelist to use with each fabric (step 740). Method 700 is then done.

Figure 8:
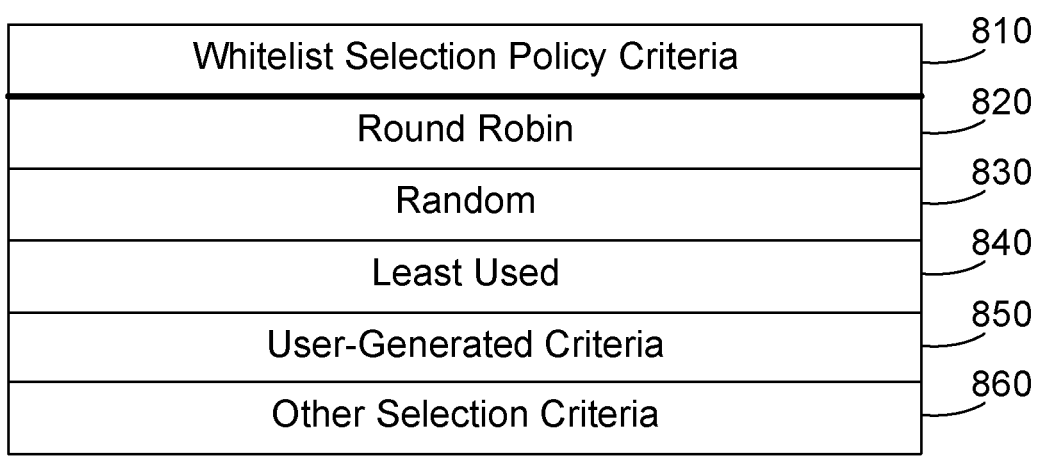
FIG. 8 shows a table of sample whitelist selection policy criteria that could be specified in a whitelist selection policy for selecting a port identifier whitelist.

FIG. 8 shows a table 810 that includes criteria that could be used to select a whitelist when allocating storage system port identifiers to virtual machines. The whitelist selection policy criteria include: round robin 820; random 830; least used 840; user-generated 850; and other selection criteria 860. Round robin 820 means the whitelists are used in a round-robin manner, which means when a new whitelist is needed, the next whitelist on the list is selected, and when the last whitelist is selected and a new whitelist is needed, the first list is selected. Random 830 means the whitelists are selected at random, which could be done, for example, by generating a random number then selecting one of the whitelists according to the generated random number. The least used 840 means a whitelist that has been used the least is selected next. User-generated criteria 850 can include any suitable criteria for selecting a whitelist that can be defined by a user. Other selection criteria 860 can include any and all other selection criteria that could be used for selecting a whitelist.

Figure 9:
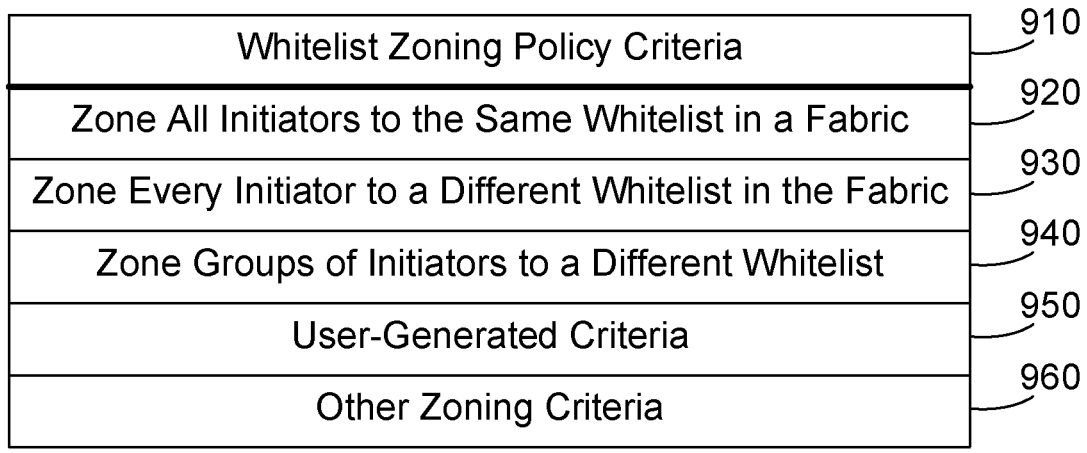
FIG. 9 shows a table of sample whitelist zoning policy criteria that could be specified in a whitelist zoning policy used to allocate storage system port identifiers using port identifier whitelists.

FIG. 9 shows a table 910 that includes criteria for zoning initiator virtual machines. Any of the criteria shown in table 910 could be used in specifying a whitelist zoning policy. Whitelist zoning policy criteria 910 include: zone all initiator virtual machines to the same whitelist in a fabric 920; zone every initiator virtual machine to a different whitelist in the fabric 930; zone groups of initiators to a different whitelist 940; user-generated criteria 950; and other zoning criteria 960.

Figure 10:
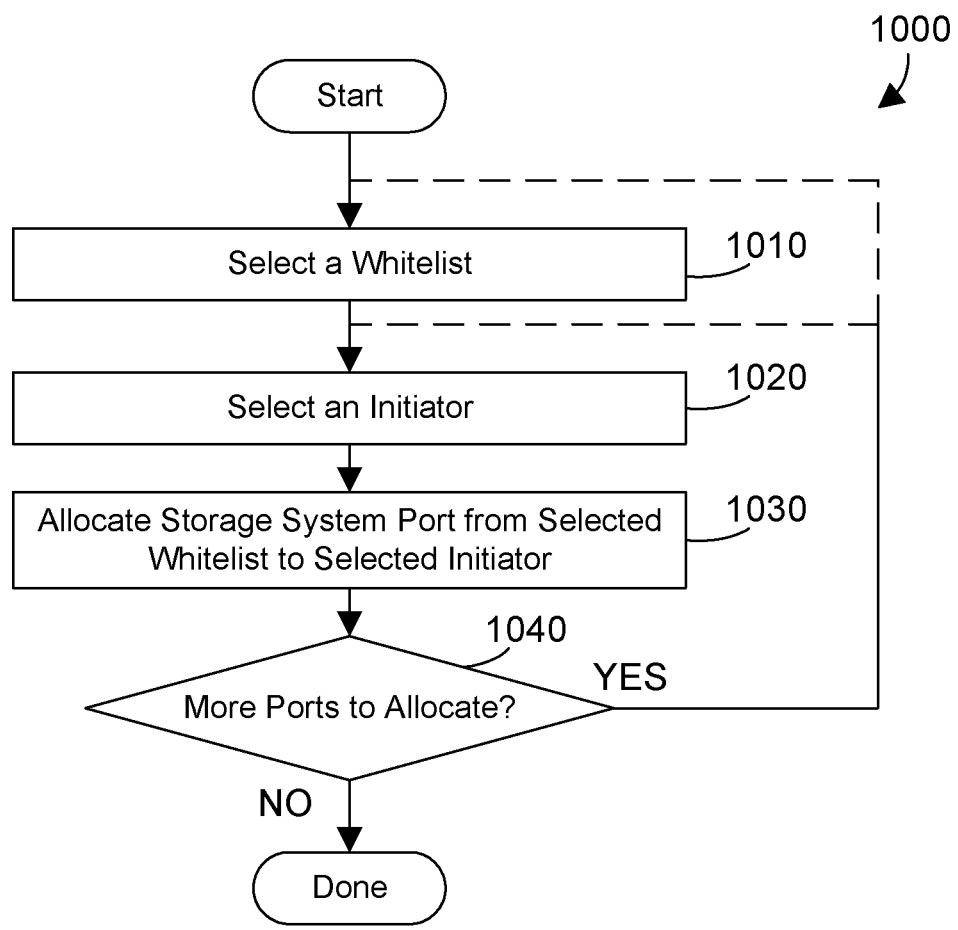
FIG. 10 is a flow diagram of a method for allocating storage port identifiers to initiator virtual machines.

Once a whitelist selection policy is defined by one of the criteria in FIG. 8, and a whitelist zoning policy is defined by one or more of the criteria in FIG. 9, the whitelists can then be used to allocator storage system ports to virtual machines. Referring to FIG. 10, a method 1000 is preferably performed by the storage system port allocator 290 shown in FIG. 2. A whitelist is selected (step 1010), most preferably using a whitelist selection policy that specifies one of the criteria in FIG. 8. An initiator virtual machine is selected (step 1020). Storage system ports corresponding to the port identifiers in the whitelist are then allocated to the selected initiator (step 1030). When there are more ports to allocate (step 1040=YES), method 1000 loops back to either step 1010 or step 1020, depending on whether or not another whitelist needs to be selected, or whether allocation can continue using the currently-selected whitelist. When the currently-selected whitelist can still be used, method 1000 loops back to step 1020. When a new whitelist needs to be selected, method 1000 loops back to step 1010. Method 1000 continues until there are no more ports to allocate (step 1040=NO), at which point method 1000 is done.

Figure 11:
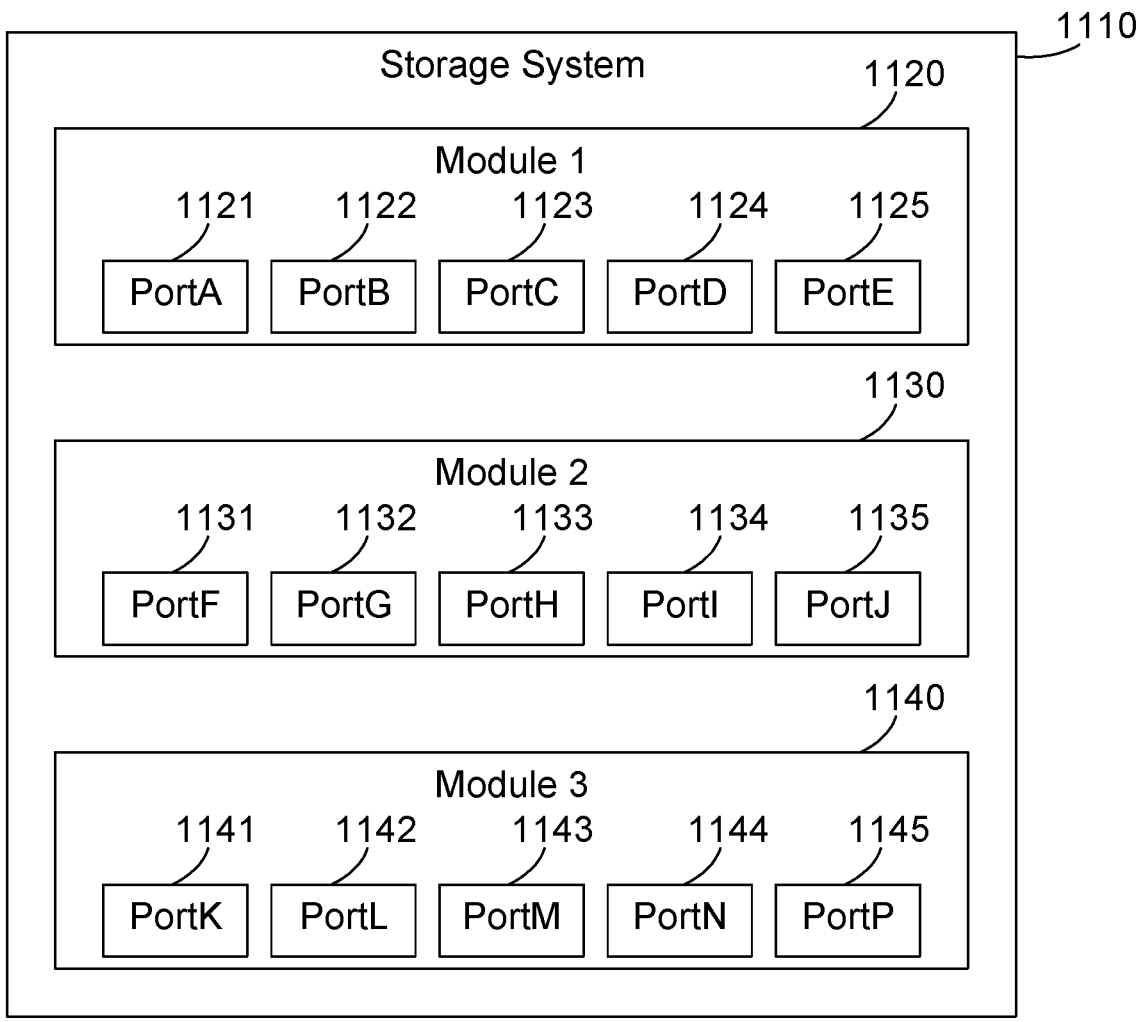
FIG. 11 is a block diagram of a sample storage system that includes three modules that each have five ports.
Figure 12:
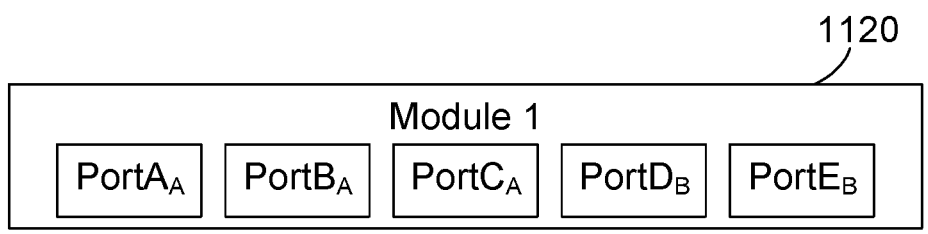
FIG. 12 is a block diagram showing the ports in Module 1 in FIG. 11 assigned to two communication fabrics represented in the subscripts.
Figure 13:
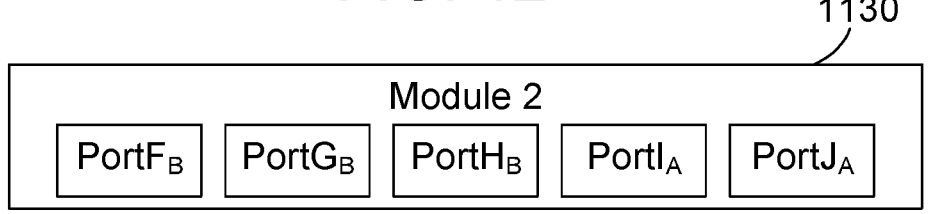
FIG. 13 is a block diagram showing the ports in Module 2 in FIG. 11 assigned to two communication fabrics represented in the subscripts.
Figure 14:
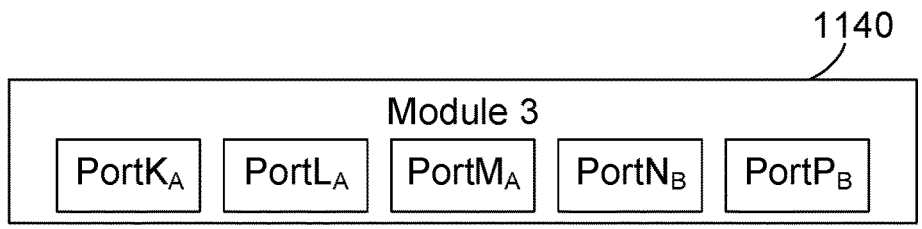
FIG. 14 is a block diagram showing the ports in Module 3 in FIG. 11 assigned to two communication fabrics represented in the subscripts.

A simple example is now presented to illustrate some of the concepts discussed generally above. This example has been extremely simplified for the purpose of illustration. FIG. 11 shows a storage system 1110 that includes three modules 1120, 1130 and 1140. Module 1120 includes ports 1121, 1122, 1123, 1124 and 1125. Module 1130 includes ports 1131, 1132, 1133, 1134 and 1125. Module 1140 includes ports 1141, 1142, 1143, 1144 and 1145. We assume some of the ports in each module are allocated to different fabrics. Thus, FIG. 12 shows the ports in Module 1120 are assigned to Fabric A and Fabric B, as denoted by the subscripts for these ports. Similarly, FIG. 13 shows the ports in module 1130 are assigned to Fabric A and Fabric B, as denoted by the subscripts for these ports. In like manner, FIG. 14 shows the ports in module 1140 are also assigned to Fabric A and Fabric B, as denoted by the subscripts for these ports.

Figure 15:
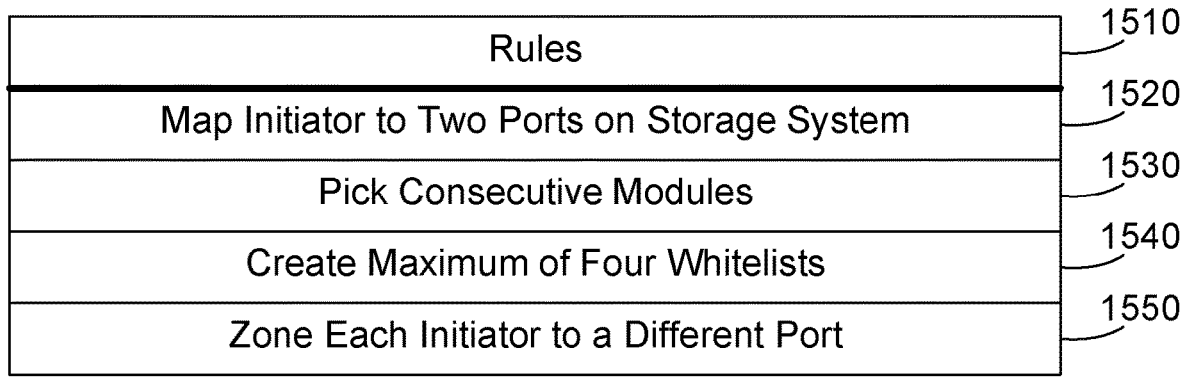
FIG. 15 shows a table of sample rules for the example in FIGS. 11-17.
Figure 16:
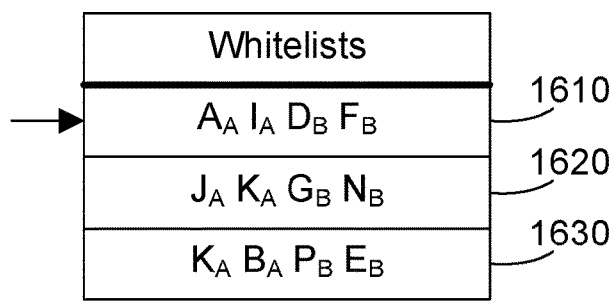
FIG. 16 shows a table of port identifier whitelists for the modules shown in FIGS. 11-14 according to the rules in FIG. 15 with a pointer identifying which whitelist was last used.
Figure 17:
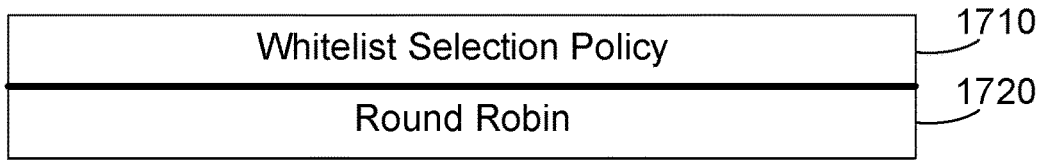
FIG. 17 shows a sample whitelist selection policy of Round Robin.

FIG. 15 shows a table 1510 of sample rules for generating whitelists for the port identifiers. Rule 1520 specifies to map an initiator virtual machine to two ports on the storage system. Rule 1530 specifies to pick consecutive modules. Rule 1540 specifies to create a maximum of four whitelists. Rule 1550 specifies to zone each initiator to a different port. Using the ports and modules shown in FIGS. 11-14, and using the rules in table 1510 in FIG. 15, three whitelists 1610, 1620 and 1630 can be automatically created as shown in FIG. 16. Each whitelist includes a port identifier, with the subscript for each port identifier identifying the fabric the port is connected to. Whitelist 1610 thus includes $A_A$, $I_A$, $D_B$ and $F_B$. Whitelist 1620 includes $J_A$, $K_A$, $G_B$ and $N_B$. Whitelist 1630 includes $K_A$, $B_A$, $P_B$ and $E_B$. An arrow to the left of the first whitelist 1610 indicates the first whitelist 1610 was last selected. A whitelist selection policy 1710 in FIG. 17 indicates a round robin 1720 criteria for selecting a whitelist. This means the next time one of the whitelists in FIG. 16 is needed, the second whitelist 1620 will be selected because the first whitelist 1610 is that last whitelist that was selected, and round robin will select the next whitelist.

We now assume four initiator virtual machines A1, A2, B1 and B2, as shown in FIG. 18. Initiator virtual machines A1 and A2 are on Fabric A, while initiator virtual machines B1 and B2 are on Fabric B. Using method 1000 in FIG. 10, the whitelist 1620 is selected (step 1010). Next, initiator A1 in FIG. 18 is selected (step 1020). A storage system port corresponding to a port identifier on the whitelist is then allocated to initiator A1 (step 1030). We see from whitelist 1620 ports J and K are on Fabric A, so one of these, such as $J_A$, is allocated to initiator A1 (step 1030), as shown at 1910 in FIG. 19. Method 1000 then loops back to step 1020, which then selects initiator A2 (step 1020). A storage system port corresponding to a port identifier on the whitelist is then allocated to initiator A2 (step 1030). We see from whitelist 1620 port K is on Fabric A, so $K_A$, is allocated to initiator A2 (step 1030), as shown at 1920 in FIG. 19. Method 1000 then loops back to step 1020, which then selects initiator B1 (step 1020). A storage system port corresponding to a port identifier on the whitelist is then allocated to initiator B1 (step 1030). We see from whitelist 1620 ports G and N are on Fabric B, so one of these, $G_B$, is allocated to initiator B1 (step 1030), as shown at 1930 in FIG. 19. Method 1000 then loops back to step 1020, which then selects initiator B2 (step 1020). A storage system port corresponding to a port identifier on the whitelist is then allocated to initiator B2 (step 1030). We see from whitelist 1620 port N is on Fabric B, so $N_B$, is allocated to initiator B2 (step 1030), as shown at 1940 in FIG. 19. There are no more ports to allocate (step 1040=NO), so method 1000 is done. The result is a port on the storage system has been allocated to each initiator, as shown in the table in FIG. 19.

The disclosure and claims herein support an apparatus comprising: at least one processor; a memory coupled to the at least one processor; and a storage system port allocator residing in the memory and executed by the at least one processor that queries a storage system for a plurality of port identifiers, automatically creates a plurality of port identifier whitelists according to defined rules for automatically generating the plurality of port identifier whitelists, then automatically allocates the plurality of port identifiers on the storage system to at least one virtual machine using at least one of the plurality of port identifier whitelists selected according to a defined whitelist selection policy.

The disclosure and claims herein further support a computer-implemented method for allocating ports on a storage system to at least one virtual machine, the method comprising: querying the storage system for a plurality of port identifiers; automatically creating a plurality of port identifier whitelists according to defined rules for automatically generating the plurality of port identifier whitelists; and automatically allocating the plurality of port identifiers on the storage system to the at least one virtual machine using at least one of the plurality of port identifier whitelists selected according to a defined whitelist selection policy.

The disclosure and claims herein additionally support a computer-implemented method for allocating ports on a storage system to at least one virtual machine, the method comprising: querying the storage system for a plurality of port identifiers; automatically creating a plurality of port identifier whitelists according to defined rules for automatically generating the plurality of port identifier whitelists, wherein the defined rules specify: a number of port identifiers for each of a plurality of storage fabrics; a number of port identifiers from a same or different storage system hardware elements; whether port identifiers not in the plurality of storage fabrics should be grouped with other port identifiers in a storage system hardware element; and user-generated criteria for generating the plurality of port identifier whitelists; an administrator manually defining at least one port identifier whitelist; an administrator editing at least one of the plurality of port identifier whitelists that were automatically generated; automatically allocating the plurality of port identifiers on the storage system to the at least one virtual machine on a separate computer system using at least one of the plurality of port identifier whitelists selected according to a defined whitelist selection policy and according to a whitelist zoning policy, wherein the whitelist selection policy specifies one of the following: round robin; random; least used; and user-generated criteria for selecting one of the plurality of port identifier whitelists; wherein the whitelist zoning policy specifies one of the following: zone all initiator virtual machines to the same whitelist in a fabric; zone every initiator to a different whitelist in the fabric; zone groups of initiators to a different whitelist; and user-generated criteria for the storage system port allocator to allocate the plurality of port identifiers on the storage system to the at least one virtual machine.

A storage system port allocator allows defining multiple whitelists for automatically allocating ports on a storage system to virtual machines. An administrator can manually define one or more of the whitelists. In addition, the storage system port allocator can automatically generate one or more whitelists based on defined rules for generating whitelists, and the administrator can then accept, edit, or ignore the automatically-generated whitelists. A whitelist selection policy is defined that determines criteria for selecting among the multiple whitelists for allocating ports to virtual machines. A whitelist zoning policy can define criteria for zoning initiator virtual machines to storage system ports in the whitelists. The storage system port allocator then allocates storage system ports to initiator virtual machines using one or more of the whitelists according to the selected whitelist that is selected according to the whitelist selection policy, and according to the whitelist zoning policy.

One skilled in the art will appreciate that many variations are possible within the scope of the claims. Thus, while the disclosure is particularly shown and described above, it will be understood by those skilled in the art that these and other changes in form and details may be made therein without departing from the spirit and scope of the claims.

The invention claimed is:

1. An apparatus comprising:
   at least one processor;
   a memory coupled to the at least one processor; and
   a storage system port allocator residing in the memory and executed by the at least one processor that queries a storage system for a plurality of port identifiers, automatically creates a plurality of port identifier whitelists according to defined rules for automatically generating the plurality of port identifier whitelists, then automatically allocates the plurality of port identifiers on the storage system to at least one virtual machine using at least one of the plurality of port identifier whitelists selected according to a defined whitelist selection policy.

2. The apparatus of claim 1 wherein the defined rules specify:
   a number of port identifiers for each of a plurality of storage fabrics;
   a number of port identifiers from a same or different storage system hardware elements;
   whether port identifiers not in the plurality of storage fabrics should be grouped with other port identifiers in a storage system hardware element; and
   user-generated criteria for generating the plurality of port identifier whitelists.

3. The apparatus of claim 1 wherein the whitelist selection policy specifies one of the following:
   round robin;
   random;
   least used; and
   user-generated criteria for selecting one of the plurality of port identifier whitelists.

4. The apparatus of claim 1 further comprising a whitelist zoning policy that defines criteria for the storage system port allocator to allocate the plurality of port identifiers on the storage system to the at least one virtual machine.

5. The apparatus of claim 4 wherein the whitelist zoning policy specifies one of the following:

zone all initiator virtual machines to the same whitelist in a fabric;
zone every initiator to a different whitelist in the fabric;
zone groups of initiators to a different whitelist; and
user-generated criteria for the storage system port allocator to allocate the plurality of port identifiers on the storage system to the at least one virtual machine.

6. The apparatus of claim 1 wherein the at least one virtual machine resides on a separate computer system coupled to the apparatus via a network.

7. The apparatus of claim 1 wherein an administrator manually defines at least one port identifier whitelist.

8. The apparatus of claim 1 wherein an administrator edits at least one of the plurality of port identifier whitelists automatically generated by the storage system port allocator.

9. A computer-implemented method for allocating ports on a storage system to at least one virtual machine, the method comprising:
   querying the storage system for a plurality of port identifiers;
   automatically creating a plurality of port identifier whitelists according to defined rules for automatically generating the plurality of port identifier whitelists; and
   automatically allocating the plurality of port identifiers on the storage system to the at least one virtual machine using at least one of the plurality of port identifier whitelists selected according to a defined whitelist selection policy.

10. The method of claim 9 wherein the defined rules specify:
   a number of port identifiers for each of a plurality of storage fabrics;
   a number of port identifiers from a same or different storage system hardware elements;
   whether port identifiers not in the plurality of storage fabrics should be grouped with other port identifiers in a storage system hardware element; and
   user-generated criteria for generating the plurality of port identifier whitelists.

11. The method of claim 9 wherein the whitelist selection policy specifies one of the following:
   round robin;
   random;
   least used; and
   user-generated criteria for selecting one of the plurality of port identifier whitelists.

12. The method of claim 9 further comprising a whitelist zoning policy that defines criteria for the storage system port allocator to allocate the plurality of port identifiers on the storage system to the at least one virtual machine.

13. The method of claim 12 wherein the whitelist zoning policy specifies one of the following:
   zone all initiator virtual machines to the same whitelist in a fabric;
   zone every initiator to a different whitelist in the fabric;
   zone groups of initiators to a different whitelist; and
   user-generated criteria for the storage system port allocator to allocate the plurality of port identifiers on the storage system to the at least one virtual machine.

14. The method of claim 9 wherein the at least one virtual machine resides on a separate computer system coupled to the apparatus via a network.

15. The method of claim 9 further comprising an administrator manually defining at least one port identifier whitelist.

16. The method of claim 9 further comprising an administrator editing at least one of the plurality of port identifier whitelists automatically generated by the storage system port allocator.

17. A computer-implemented method for allocating ports on a storage system to at least one virtual machine, the method comprising:
   querying the storage system for a plurality of port identifiers;
   automatically creating a plurality of port identifier whitelists according to defined rules for automatically generating the plurality of port identifier whitelists, wherein the defined rules specify:
      a number of port identifiers for each of a plurality of storage fabrics;
      a number of port identifiers from a same or different storage system hardware elements;
      whether port identifiers not in the plurality of storage fabrics should be grouped with other port identifiers in a storage system hardware element; and
      user-generated criteria for generating the plurality of port identifier whitelists;
   an administrator manually defining at least one port identifier whitelist;
   an administrator editing at least one of the plurality of port identifier whitelists that were automatically generated;
   automatically allocating the plurality of port identifiers on the storage system to the at least one virtual machine on a separate computer system using at least one of the plurality of port identifier whitelists selected according to a defined whitelist selection policy and according to a whitelist zoning policy, wherein the whitelist selection policy specifies one of the following:
      round robin;
      random;
      least used; and
      user-generated criteria for selecting one of the plurality of port identifier whitelists;
   wherein the whitelist zoning policy specifies one of the following:
      zone all initiator virtual machines to the same whitelist in a fabric;
      zone every initiator to a different whitelist in the fabric;
      zone groups of initiators to a different whitelist; and
      user-generated criteria for the storage system port allocator to allocate the plurality of port identifiers on the storage system to the at least one virtual machine.

\* \* \* \* \*